United States Patent
Itoh (10) Patent No.: US 7,593,350 B2
(45) Date of Patent: Sep. 22, 2009

(54) WIRELESS COMMUNICATION BETWEEN INFORMATION PROCESSING DEVICE AND WIRELESS COMMUNICATION TERMINAL

(75) Inventor: Satoshi Itoh, Machida (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 750 days.

(21) Appl. No.: 10/989,812

(22) Filed: Nov. 16, 2004

(65) Prior Publication Data

US 2005/0152376 A1 Jul. 14, 2005

(30) Foreign Application Priority Data

Nov. 20, 2003 (JP) ............................. 2003-391300

(51) Int. Cl.
*H04L 12/28* (2006.01)
(52) U.S. Cl. ..................................... 370/254; 455/41.2
(58) Field of Classification Search .......... 370/254–258
See application file for complete search history.

(56) References Cited

U.S. PATENT DOCUMENTS

| | | | | |
|---|---|---|---|---|
| 6,122,493 | A * | 9/2000 | Kobayashi et al. | 455/193.1 |
| 6,185,204 | B1 * | 2/2001 | Voit | 370/352 |
| 6,304,556 | B1 * | 10/2001 | Haas | 370/254 |
| 6,771,985 | B1 * | 8/2004 | Iinuma | 370/280 |
| 7,036,031 | B2 * | 4/2006 | Takeuchi | 455/73 |
| 7,076,209 | B2 * | 7/2006 | Sugikawa et al. | 370/463 |
| 2003/0220090 | A1 * | 11/2003 | Iida | 455/401 |
| 2003/0228842 | A1 * | 12/2003 | Heinonen et al. | 455/41.2 |
| 2004/0095963 | A1 * | 5/2004 | Rakib | 370/503 |
| 2006/0069749 | A1 * | 3/2006 | Herz et al. | 709/219 |

* cited by examiner

*Primary Examiner*—Chirag G Shah
*Assistant Examiner*—Joshua Smith
(74) *Attorney, Agent, or Firm*—Patrick J. Daugherty; Driggs, Hogg, Daugherty & Del Zoppo Co., LPA (57) ABSTRACT

Apparatus includes a section which transmits an inquiry packet for inquiry as to whether any wireless communication terminal exists within such range as to be able to communicate with the apparatus, detects each of a plurality of wireless data communication terminals transmitting inquiry response packets in response to the packet, and completes the detection of wireless communication terminals if no wireless communication terminal is detected within a predetermined detection completion timeout period after starting the transmission of the packet, a section which suspends the detection of wireless communication terminals performed by the terminal detection section if a wireless communication terminal is detected, a section which performs wireless data communication with the detected wireless communication terminal while the detection of wireless communication terminals is suspended, and a section which restarts detection of other wireless communication terminals by the terminal detection section after the completion of the data communication is detected.

19 Claims, 6 Drawing Sheets

WIRELESS COMMUNICATION BETWEEN INFORMATION PROCESSING DEVICE AND WIRELESS COMMUNICATION TERMINAL

BACKGROUND OF THE INVENTION

The present invention relates to an information processing device, a wireless communication method, a wireless communication program and a recording medium. More particularly, the present invention relates to an information processing device, a wireless communication method, a wireless communication program and a recording medium for efficiently detecting a wireless communication terminal at the time of wireless communication with the wireless communication terminal.

In short-range wireless communication such as Bluetooth®, a detection process for detecting a wireless communication terminal with which communication should be performed is performed before data communication. For example, in Bluetooth®, a wireless communication terminal operating as a master transmits an inquiry packet for inquiry as to whether or not any wireless communication terminal operating as a slave exists in a range in which it can communicate with the master. The wireless communication terminal receiving the inquiry packet transmits an inquiry response packet in response to the inquiry packet. The master wireless communication terminal detects the slave wireless communication terminal by receiving this inquiry response packet.

Generally, in the above-described process, the master wireless communication terminal waits for passage of a predetermined timeout period after starting the detection process to completely detect all wireless communication terminals located in a range in which they can communicate with the master, and thereafter starts, for example, processing for selection and calling of a wireless communication terminal with which the master will communicate. In Bluetooth®, a wireless communication terminal operating as a slave waits for reception of an inquiry packet while changing a waiting frequency on the basis of a frequency hopping pattern determined according to identification information for that wireless communication terminal. Therefore, it takes a long time for the slave wireless communication terminal to receive an inquiry packet having a frequency equal to the waiting frequency and the above-mentioned timeout period is hence set to a long time, e.g., ten seconds.

As a technique to reduce the time required for the above-described detection processing in Bluetooth®, a communication system has been disclosed in which identification information for slave wireless communication terminals is held in a management facility in advance and one of the wireless communication terminals selected by a user is called without performing any detection process (Patent Document 1).

[Patent Document 1] Published Unexamined Patent Application No. 2002-300174

Bluetooth® may be applied in a way that a Bluetooth® enabled information processing device is installed in a store which transmits information about the store when a wireless communication terminal carried by a user is detected in a range in which communication with the information processing device can be performed. In such a system, it is necessary to quickly transmit store information to a wireless communication terminal carried by a user who is moving, and the system would not function effectively if the detection processing is performed using a long timeout period. Also, there is a need to suitably select wireless communication terminals brought to closer to the store among an indefinite number of wireless communication terminals, which could not be realized even by the method of Patent Document 1 requiring no detection processing.

SUMMARY OF THE INVENTION

Therefore, a purpose of the present invention is to provide an information processing device, a wireless communication method, a wireless communication program and a recording medium, which can solve the above-described problem. This purpose can be attained by a combination of features described in the independent claims in the appended claims. In the dependent claims, further advantageous examples of the present invention are specified.

According to a first aspect of the present invention, there is provided an information processing device which performs wireless data communication with each of wireless communication terminals, the information processing device having a terminal detection section which transmits an inquiry packet for inquiry as to whether or not any wireless communication terminal exists in such a range as to be able to communicate with the information processing device, detects one by one a plurality of wireless data communication terminals transmitting inquiry response packets in response to the inquiry packet, and completes the detection of wireless communication terminals if no wireless communication terminal is detected within a predetermined detection completion timeout period after starting the transmission of the inquiry packet, a terminal detection suspension section which suspends the detection of wireless communication terminals performed by the terminal detection section if a wireless communication terminal is detected within the detection completion timeout period after the terminal detection section started the transmission of the inquiry packet, a data communication section which performs wireless data communication with the wireless communication terminal detected by the terminal detection section while the detection of wireless communication terminals is suspended, and a terminal detection restarting section which restarts detection of other wireless communication terminals by the terminal detection section when the completion of the data communication is detected. Also provided are a wireless communication method for the information processing device, a wireless communication program and a recording medium therefor.

It should be noted that the above-described summary of the present invention does not list all the features of the invention and that sub combinations of the features can also constitute the invention.

According to the present invention, it is possible to provide an information processing device which can perform, without waiting for a timeout, data communication with detected wireless communication terminals in order.

Implementations of the invention include providing any of the various aspects of the invention to a customer. Accordingly, implementations of the invention include implementations as a service in which any of the method, apparatus, and program product aspects, alone or in combination, are deployed at a customer site to address the above described challenges.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. Further, all combinations of features described below are not necessarily indispensable to the solution according to the present invention.

Figure 1:
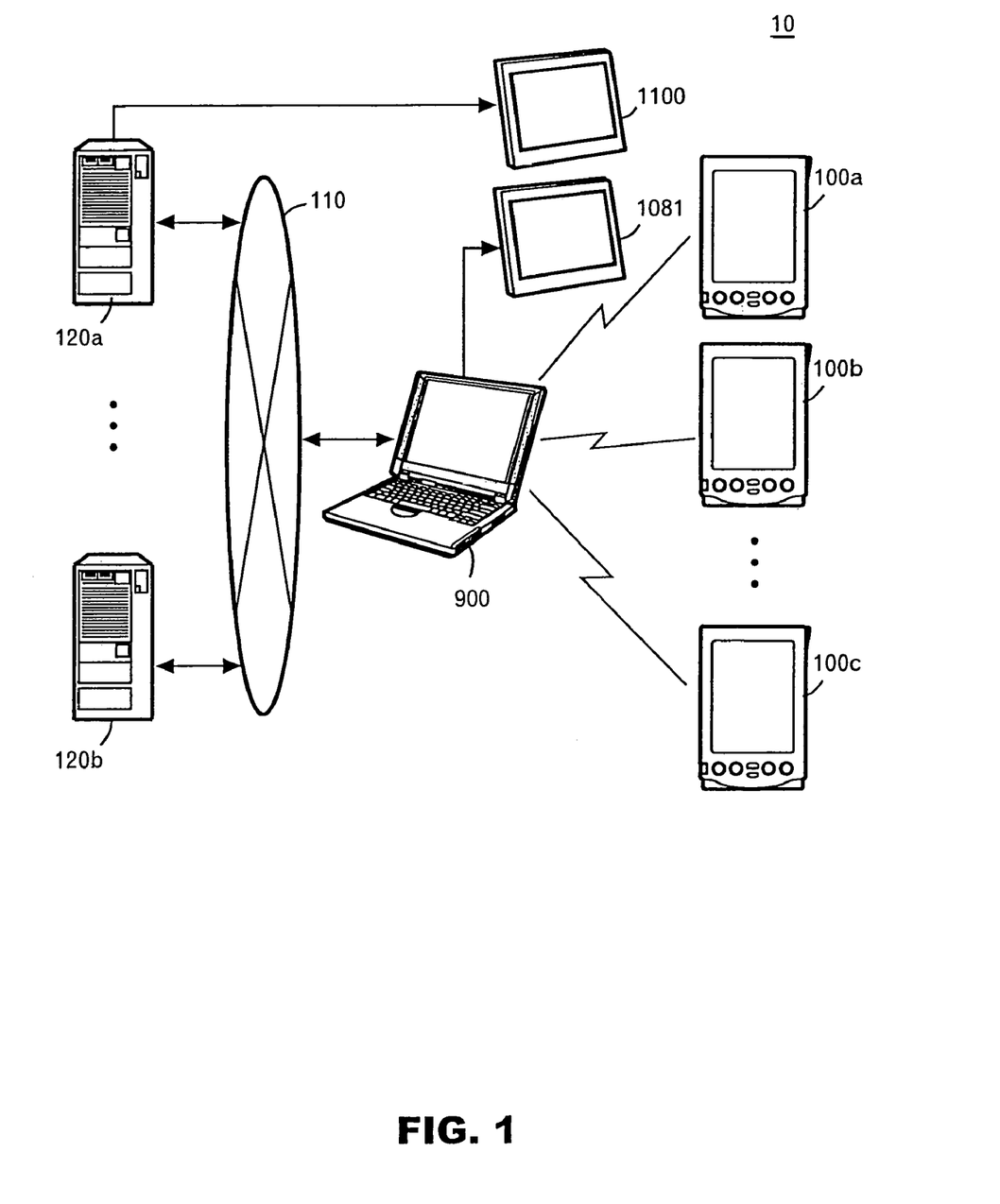
FIG. 1 shows a configuration of a wireless communication system 10 in an embodiment of the present invention.

Referring now more particularly to the accompanying drawings, in which like numerals indicate like elements or steps throughout the several views, FIG. 1 shows a configuration of a wireless communication system 10 according to this embodiment. The wireless communication system 10 enables an information processing device 900, which communicates with a plurality of wireless communication terminals 100 by short-range wireless communication such as Bluetooth®, to perform, without waiting for a timeout, data communication with wireless communication terminals 100 in the order the wireless communication terminals 100 are detected. The wireless communication system 10 thus enables speedy data communication between the information processing device 900 and the wireless communication terminals 100.

The wireless communication system 10 has a plurality of wireless communication terminals 100 (100a to 100c), an information processing device 900, information processing devices 120 (120a, 120b), and a network 110. Each of the wireless communication terminals 100 may be a PDA (personal digital assistant) or the like, which is carried by a user and performs short-range wireless communication by, for example, Bluetooth®. The information processing device 900 performs wireless data communication with each of the wireless communication terminals 100 by using Bluetooth®. The information processing devices 120 are connected to the information processing device 900 via the network 110 comprising a WAN such as the Internet or a LAN such as an intranet.

The information processing device 900 in the above-described system operates as a master in Bluetooth®, while each of the wireless communication terminals 100 operates as a slave in Bluetooth®.

Through the above-described wireless communication system 10, services described below by way of example are offered to users of the wireless communication terminals 100. For example, the information processing device 900 is installed in a store. When a user of one wireless communication terminal 100 comes closer to the store and enters a range in which communication with the information processing device 900 can be performed, the information processing device 900 transmits information such as identification information for the store and advertisements to the wireless communication terminal 100. Also, for example, the information processing device 900 relays communication between each of the wireless communication terminals 100 and the network 110 to relay data communication between the wireless communication terminal 100 and the information processing devices 120 through Bluetooth®. The information processing device 120a may have an external display 1100 connected to the information processing device 120a. In such a case, the information processing device 120a may display on the external display 1100 information such as Web pages in the information processing device 120a accessed from one of the wireless communication terminals 100 through the network 110 to present the information to the user of that wireless communication terminal 100, thereby enabling the user of that wireless communication terminal 100 to see the information in the information processing device 120a by using the external display 1100 having a screen larger than that of the wireless communication terminal 100 in the range in which communication with the information processing device 900 can be performed.

Additionally, the information processing device 900 may also have an external display 1081 connected to the information processing device 900 to display on the external display 1081 information selected according to one wireless communication terminal 100 which has entered the range in which communication with the information processing device 900 can be performed. That is, the external display 1081 may display, for example, information on the information processing device 120 accessed by the user of the wireless communication terminal 100 using the wireless communication terminal 100. Also, for example, the information processing device 900 may obtain from the wireless communication terminal 100 information which is stored in the wireless communication terminal 100 and indicates user's liking, and display information such as an advertisement matching the user's liking on the external display 1081.

A functional configuration of the information processing device 900 in this embodiment will now be described. The information processing device 900 has an information processing section 200 (for example, see FIG. 6 which describes a different embodiment using some of the same sections), a wired communication section 220 (also shown in FIG. 6), the external display 1081 shown in FIG. 1, a wireless communication section, a terminal detection section, a suspension condition determination section, a terminal detection suspension section, a data communication section, and a terminal detection restarting section. The information processing section 200 controls wireless communication with a plurality of wireless communication terminals 100, communication with the network 110 through the wired communication section 220 and display on the external display 1081. The external display 1081 displays, for example, to each of users of wireless communication terminals 100, an onscreen image designated by the information processing section 200. The wired communication section 220 performs communication between the information processing device 900 and the network 110. The wireless communication section transmits or receives radio waves according to Bluetooth® for communication with the wireless communication terminals 100.

The terminal detection section receives from the information processing section 200 an instruction to start wireless communication, transmits an inquiry packet for inquiry as to whether or not any wireless communication terminal 100 exists in a range in which it can communicate with the information processing device 900, and detects one by one a plurality of wireless communication terminals 100 each transmitting an inquiry response packet in response to the inquiry packet. If the terminal detection section detects no wireless communication terminal 100 within a predetermined detection completion timeout period after starting the transmission of the inquiry packet, it completes detection of wireless communication terminals 100.

When the suspension condition determination section determines that one wireless communication terminal 100 detected within the detection completion timeout period after the transmission of the inquiry packet was started belongs to a predetermined group of wireless communication terminals 100, it determines that a suspension condition for suspending the detection of wireless communication terminals 100 is satisfied. On the other hand, when the suspension condition determination section determines that the wireless communication terminal 100 does not belong to the group, it determines that the suspension condition for suspending the detection of wireless communication terminals 100 is not satisfied. For example, wireless communication terminals 100 which receive a service for connection to the network 110 provided by the information processing device 900, and wireless communication terminals 100 to be lent for reception of advertisements from each store are registered in advance in this group of wireless communication terminals 100.

The terminal detection suspension section suspends the detection of wireless communication terminals 100 performed by the terminal detection section in a case where the terminal detection section detects one wireless communication terminal 100 within the detection completion timeout period after the transmission of the inquiry packet was started. The terminal detection suspension section in this embodiment suspends the detection of wireless communication terminals 100 performed by the terminal detection section if it is determined that the suspension condition is satisfied in a case where the terminal detection section detects one wireless communication terminal 100 within the detection completion timeout period after starting the transmission of the inquiry packet. If it is determined that the suspension condition is not satisfied, the detection of wireless communication terminals 100 by the terminal detection section is not suspended and the terminal detection section is allowed to continue detection of further wireless communication terminals 100. In this manner, processing for detecting the wireless communication terminals 100 by the terminal detection section can be prevented from being suspended in a case where a wireless communication terminal 100 which does not belong to a predetermined group is detected.

While the detection of wireless communication terminals 100 is suspended by the terminal detection suspension section, the data communication section performs data communication with the wireless communication terminal 100 detected by the terminal detection section through the wireless communication section in accordance with an instruction from the information processing section 200. The data communication section has an attribute information acquisition section, a data communication condition determination section and a data communication processing section.

While the detection of wireless communication terminals 100 is suspended, the attribute information acquisition section transmits, to the wireless communication terminal 100 detected by the terminal detection section through the wireless communication section, an attribute information request packet for requesting transmission of attribute information set in the wireless communication terminal 100. The attribute information acquisition section acquires attribute information contained in an attribute information response packet transmitted by the wireless communication terminal 100 after receiving the attribute information request packet. This attribute information may comprise information for identifying Bluetooth® functions of the wireless communication terminal 100, information as to whether or not the wireless communication terminal 100 is executing an application program for performing data communication with the information processing device 900, and information for identifying data already transmitted to or received from the information processing device 900 by the wireless communication terminal 100.

While the detection of wireless communication terminals 100 is suspended, the data communication condition determination section determines, in accordance with the attribute information, whether or not wireless data communication with the wireless communication terminal 100 detected by the terminal detection section will be performed. That is, if, for example, attribute information is received which indicates that the wireless communication terminal 100 has particular Bluetooth® functions, that the wireless communication terminal 100 is executing an application program for performing data communication with the information processing device 900, or that data exists which has not been transmitted to or received from the information processing device 900 by the wireless communication terminal 100, the data communication condition determination section determines that wireless data communication with the wireless communication terminal 100 will be performed.

While the detection of wireless communication terminals 100 is suspended, if the data communication condition determination section determines that data communication will be performed, the data communication processing section performs data communication with the wireless communication terminal 100 through the wireless communication section. While the detection of wireless communication terminals 100 is suspended, if it is determined that data communication will not be performed, the data communication processing section waits for the completion of the detection of wireless communication terminals 100 by the terminal detection section and performs data communication after the completion of the detection of wireless communication terminals 100.

The terminal detection restarting section restarts detection of other wireless communication terminals 100 performed by the terminal detection section when it detects the completion of data communication performed by the data communication processing section. While the detection of wireless communication terminals 100 is suspended, if the data communication processing section determines that data communication will not be performed, the terminal detection restarting section restarts detection of other wireless communication terminals 100 by the terminal detection section without making the data communication processing section perform data communication.

Figure 2:
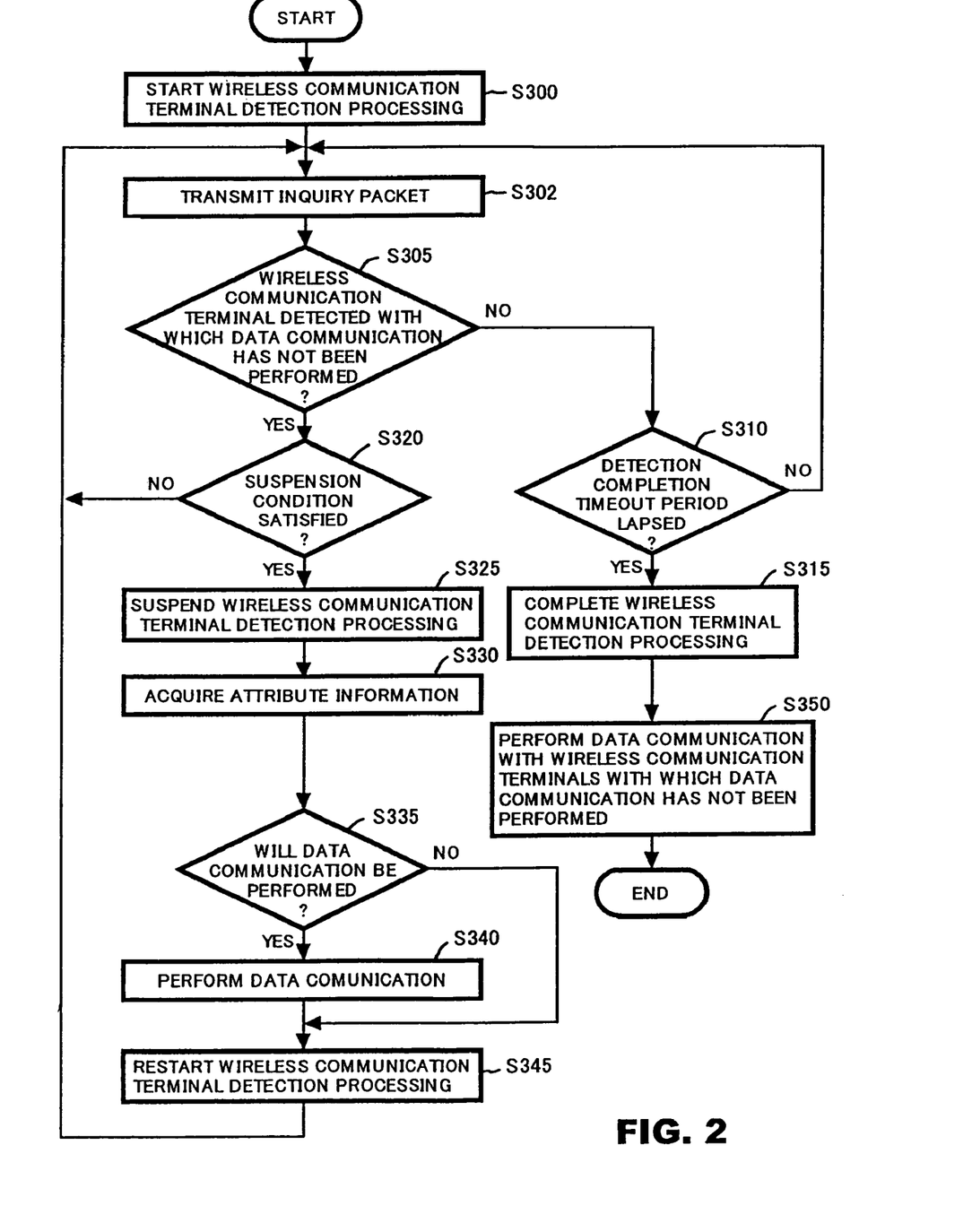
FIG. 2 shows a flow of processing in the information processing device 900 in the embodiment of the present invention.

FIG. 2 shows a flow of processing in the information processing device 900 in this embodiment.

The information processing section 200 first starts detection processing by instructing the terminal detection section to detect wireless communication terminals 100 at predetermined time intervals of, for example, 10 to 20 seconds in order to perform data communication with each of a plurality of wireless communication terminals 100 positioned in the range in which it can communicate with the information processing device 900 (step S300).

According to this instruction, the terminal detection section transmits an inquiry packet (S302). More specifically, the terminal detection section successively transmits one by one a plurality of inquiry packets in the respective time slots in which the master can transmit packets. In this embodiment, the terminal detection section transmits an IQ packet (inquiry packet) in Bluetooth® as the inquiry packet. Next, the terminal detection section detects, with respect to one of the inquiry packets, a wireless communication terminal 100 transmitting an inquiry response packet in a time slot following the inquiry packet (S305). In this embodiment, the terminal detection section receives as the inquiry response packet an FHS packet transmitted from the wireless communication terminal 100 in response to the IQ packet, thereby detecting the wireless communication terminal 100.

If no inquiry response packet responding to the inquiry packet is received (S305: No), and the predetermined detection completion timeout period, e.g., 10 seconds, has not lapsed after the transmission of the inquiry packet was started (S310: No), the terminal detection section returns the process to S302 and transmits an inquiry packet in the next time slot (S302). If no wireless communication terminal 100 is detected within the detection completion time period after starting the transmission of inquiry packets, the terminal detection section detects a detection completion timeout (S310: Yes), thereby completing the wireless communication terminal 100 detection processing (S315).

If an inquiry response packet responding to the inquiry packet is received, the terminal detection section detects a wireless communication terminal 100 that has transmitted the inquiry response packet (S305: Yes). The terminal detection section then outputs to the suspension condition determination section and the terminal detection suspension section identification information such as a Bluetooth address contained in the inquiry response packet transmitted by the wireless communication terminal 100. Next, if the suspension condition determination section determines, based on the identification information for the detected wireless communication terminal 100, that the wireless communication terminal 100 does not belong to a predetermined group of wireless communication terminals 100 (S320: No), the process returns to S302 and the terminal detection section continues the detection processing without suspension.

If the suspension condition determination section determines, based on the identification information for the detected wireless communication terminal 100, that the wireless communication terminal 100 belongs to the predetermined group of wireless communication terminals 100, it determines that the suspension condition is satisfied (S320: Yes). In this case, the terminal detection suspension section suspends the transmission of inquiry packets performed by the terminal detection section within the detection completion timeout period (S325). More specifically, the terminal detection suspension section stops the terminal detection section from successively transmitting the inquiry packets one by one in the time slots in which the master can transmit packets.

Next, while the detection of wireless communication terminals 100 is suspended, the attribute information acquisition section transmits an attribute information request packet to the wireless communication terminal 100 detected by the terminal detection section through the wireless communication section, and receives an attribute information response packet, thereby acquiring information on attributes of the wireless communication terminal 100 (S330). The attribute information acquisition section may acquire attribute information by using discovery processing in Bluetooth®.

Next, while the detection of wireless communication terminals 100 is suspended, the data communication condition determination section determines, based on the attribute information, whether or not wireless data communication with the detected wireless communication terminal 100 will be performed (S335). If it is determined that data communication will be performed while the detection of wireless communication terminals 100 is suspended, the data communication processing section establishes a connection to the wireless communication terminal 100 through the wireless communication section and performs wireless data communication (S340).

More specifically, the data communication processing section may perform data communication described below.

(1) In a case where a service to transmit information such as an advertisement to the wireless communication terminal 100 is offered, the information processing section 200 transmits the information to the wireless communication terminal 100 by using, for example, the object push profile in Bluetooth®. The wireless communication terminal 100 receives the information and presents the information to the user by outputting the information, for example, to the display of the wireless communication terminal 100.

(2) In a case where a service to connect the wireless communication terminal 100 to the network 110 is offered, the information processing section 200 first transmits network connection information such as an IP address used for connection to the network 110 and addresses of a DNS server and a gateway to the wireless communication terminal 100 through the data communication processing section and the wireless communication section. The information processing section 200 transmits the network connection information to the wireless communication terminal 100 by using, for example, the object push profile in Bluetooth®. The wireless communication terminal 100 receives the network connection information and sets, based on the network connection information, a communication program to be used by the wireless communication terminal 100 to establish a connection to the network 110.

When a request for access to information in one of the information processing devices 120 is thereafter received from the wireless communication terminal 100, the data communication processing section and the information processing section 200 transfer this access request to that information processing device 120 through the network 110 to enable the information processing device 120 to perform access processing. In this access processing, the information processing device 120*a* may display on the external display 1100 the information in the information processing device 120*a* designated by the access request. Alternatively, the information processing section 200 in the information processing device 900 may receive from the information processing device 120*a* an access response to the access request, and display on the external display 1081 information on the information processing device 120*a* contained in the access response.

In a case where a service to connect the wireless communication terminal 100 to the network 110 is offered, the information processing device 900 may connect a plurality of wireless communication terminals 100 to the network 110 by using ICS (Internet Connection Sharing) instead of performing the above-described process. More specifically, the information processing section 200 in the information processing device 900 transmits network connection information including a Bluetooth address and a computer name of the information processing device 900 to the wireless communication terminals 100 through the data communication processing section and the wireless communication section. The wireless communication terminals 100 receive the network connection information and communicate with the information processing device 900 based on the network connection information. The information processing section 200 in the information processing device 900 adds information for identifying the wireless communication terminals 100 to the access requests to the information processing devices 120 from the wireless communication terminals 100 to make it possible to identify each access requester, and accesses the information processing devices 120 as a proxy for each of the wireless communication terminals 100.

(3) In a case where information selected correspondingly with one wireless communication terminal 100 is displayed on the external display 1081, the information processing section 200 performs data processing for acquiring information indicating user's liking from the wireless communication terminal 100. An onscreen image selected from a plurality of onscreen images based on the information indicating the user's liking is displayed on the external display 1081.

When the data communication in S340 is completed or if it is determined in S335 that the data transmission will not be performed while the detection of wireless communication terminals 100 is suspended, the terminal detection restarting section restarts detection of other wireless communication terminals 100 by the terminal detection section (S345). In response to this, the terminal detection section restarts transmission of inquiry packets to restart the detection of other wireless communication terminals 100 (S302).

When the terminal detection section in this embodiment restarts the detection of wireless communication terminals 100, it again performs processing for detecting the wireless communication terminals 100 by using the same detection completion timeout period as that used initially in the detection processing. More specifically, when the detection of other wireless communication terminals 100 is restarted by the terminal detection restarting section, the terminal detection section again transmits inquiry packets and detects one by one a plurality of wireless communication terminals 100 which transmit inquiry response packets in response to the inquiry packets. If no wireless communication terminal 100 is detected within the detection completion time period after restarting the transmission of inquiry packets (S305: No; S310: Yes), the terminal detection section completes the detection of wireless communication terminals 100 (S315).

Alternatively, the terminal detection section may perform restarted processing for detecting the wireless communication terminals 100 by using a detection completion timeout period shorter than the detection completion timeout period used in the detection processing before restarting. More specifically, the detection completion timeout period after restarting may be set so that the sum of the period in which inquiry packets are transmitted one after another in the detection processing before restarting and the detection completion timeout period after restarting is equal to or longer than the detection completion timeout period used when the detection processing is started.

Also, in the detection of other wireless communication terminals 100 restarted by the terminal detection restarting section, the terminal detection section may transmit inquiry packets to detect, one by one, wireless communication terminals 100 with which data communication has not been performed by the data communication section, among a plurality of wireless communication terminals 100 transmitting inquiry response packets. In this manner, the terminal detection section ignores inquiry response packets from wireless communication terminals 100 with which data communication has already been performed so that other wireless communication terminals 100 can be detected.

As a result of the above processing, when processing for detecting wireless communication terminals 100 is completed in S315, the information processing device 900 completes the detection of wireless communication terminals positioned in the range in which communication with the information processing device 900 can be performed. For a wireless communication terminal 100 with which data communication should be immediately performed among a plurality of wireless communication terminals 100, the data communication processing section in the information processing device 900 completes the data communication while the detection of wireless communication terminals 100 is suspended (S340). On the other hand, for a wireless communication terminal 100 with which data communication may be started later, the data communication processing section in the information processing device 900 performs the data communication after the completion of detection of all the wireless communication terminals 100 (S350).

According to the information processing device 900 described above, when it determines, based on attribute information, that an application program for receiving information such as an advertisement is running on a wireless communication terminal 100, it is capable of immediately performing data communication while the detection of wireless communication terminals 100 is suspended. On the other hand, when the information processing device 900 receives from a wireless communication terminal 100 attribute information indicating, for example, that connection to the network 110 is requested, it may start data communication after waiting for lapse of the detection completion timeout period, because that wireless communication terminal 100 is considered to stay in the range in which it can communicate with the information processing device 900 during the data communication.

In S305 described above, the information processing device 900 may collectively perform, after a timeout determined by using a detection suspension timeout period shorter than the detection completion timeout period, data communication with wireless communication terminals 100 detected in the detection suspension timeout period, instead of suspending the detection of wireless communication terminals 100 each time a wireless communication terminal 100 is detected. More specifically, if in S305 any wireless communication terminal 100 is detected within a predetermined detection suspension timeout period after the transmission of inquiry packets was started, the terminal detection suspension section suspends, after the detection suspension timeout period, the detection of wireless communication terminals 100 performed by the terminal detection section. This detection suspension timeout period is set in advance to a value shorter than the detection completion timeout period, e.g., one second. While the detection of wireless communication terminals 100 is suspended, the data communication section performs data communication with one or more wireless communication terminals 100 detected by the terminal detection section within the detection suspension timeout period.

Thus, data communication can be started more promptly in comparison with the case where data communication is started after waiting for a lapse of the detection completion timeout period. Also, the overhead necessary for separately detecting wireless communication terminals 100 can be reduced.

Figure 3:
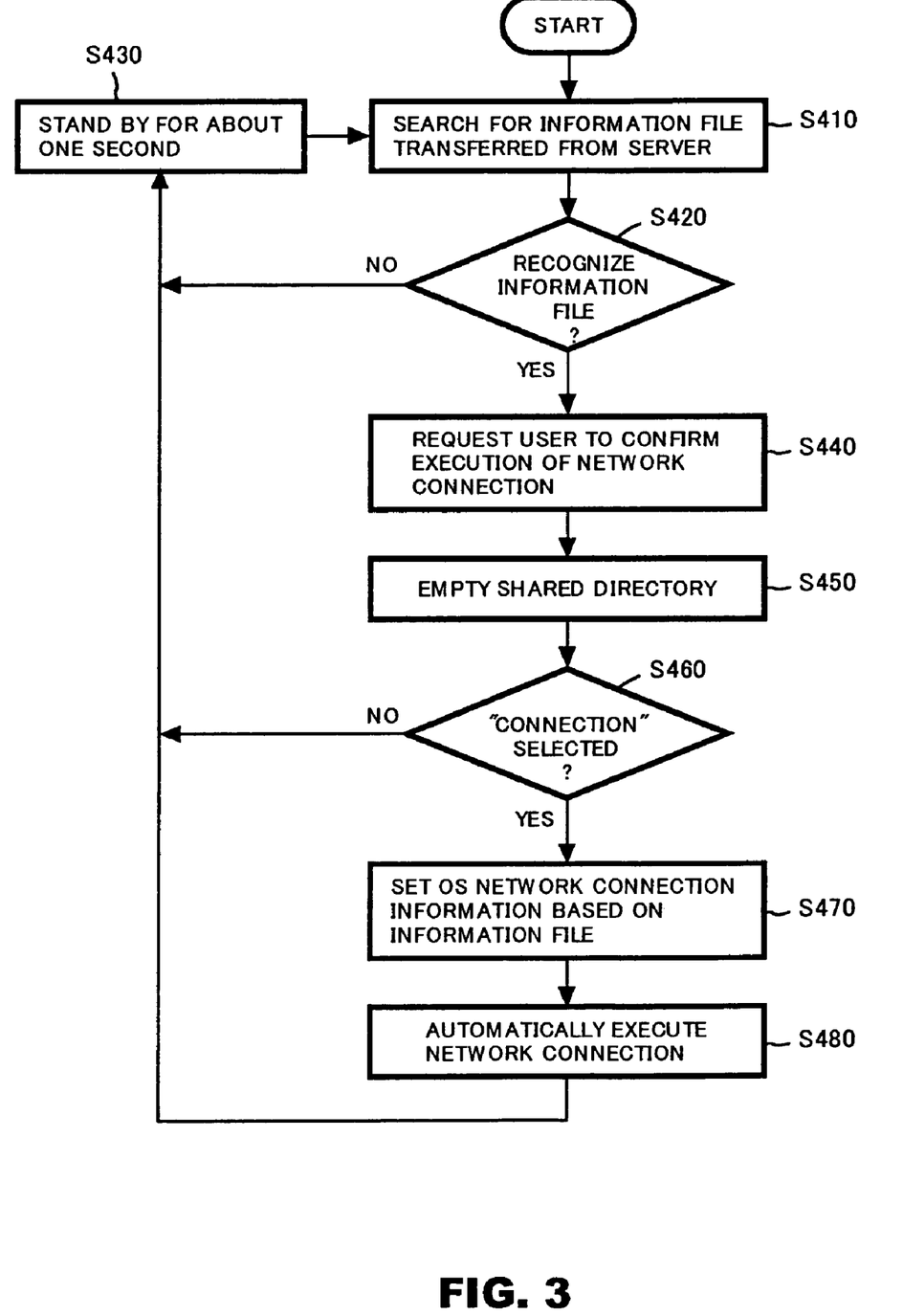
FIG. 3 shows a flow of processing in the wireless communication terminal 100 in the embodiment of the present invention.

FIG. 3 shows a flow of processing in a wireless communication terminal 100 in this embodiment. In this processing flow, the wireless communication terminal 100 sets, based on network connection information transferred from the information processing device 900 by means of Bluetooth®, a communication program used by the wireless communication terminal 100 to establish a connection to the network 110.

The wireless communication terminal 100 first performs a search to check whether or not an information file transmitted from the information processing device 900 and containing network connection information is stored in a shared directory provided in a storage on the wireless communication terminal 100 in accordance with, for example, the object push profile (S410). If the information file cannot be recognized because it is not stored in the storage of the wireless communication terminal 100 (S420: No), the wireless communication terminal 100 stands by for a predetermined time period, e.g., one second (S430), and returns the process to step S410 to continuously monitor transfer of the information file from the information processing device 900.

If the information file is stored in the storage of the wireless communication terminal 100, the wireless communication terminal 100 recognizes the information file (S420: Yes). Next, the wireless communication terminal 100 receives, as an input from the user of the wireless communication terminal 100, an instruction as to whether or not network connection should be executed (S440), obtains the information file stored in the shared directory, and empties the shared directory (S450).

If no instruction to execute network connection is input from the user so that network connection is not selected (S460: No), the wireless communication terminal 100 stands by for a predetermined time period (S430) and returns the process to S410.

If an instruction to execute network connection is input by the user (S460: Yes), the wireless communication terminal 100 sets a communication program provided in an operating system of the wireless communication terminal 100 based on the network connection information contained in the information file (S470). The wireless communication terminal 100 then establishes a connection to the network 100 via the information processing device 900 by using connection parameters set according to the network connection information (S480), and advances the process to S430. More specifically, the wireless communication terminal 100 forms a link to the information processing device 900 by using the LAN access profile in Bluetooth® and establishes a connection to the network 110 by using the information processing device 900 as an access point. After establishment of the connection, the wireless communication terminal 100 can perform data communication with the information processing devices 120 via the information processing device 900 and the network 110.

The above-described wireless communication terminal 100 can set a communication program for the wireless communication terminal 100 based on network information contained in an information file transmitted by the information processing device 900, and establish a connection to the network 110 by using connection parameters set according to the network connection information.

Information such as an advertisement received by the wireless communication terminal 100 from the information processing device 900 can be displayed to the user in a similar manner by the following processing. That is, in S410 and 420, the wireless communication terminal 100 makes a search to recognize that an information file containing information such as an advertisement is stored in the shared directory. The wireless communication terminal 100 then displays such information based on the information file and thereafter empties the shared directory in S450.

Figure 4:
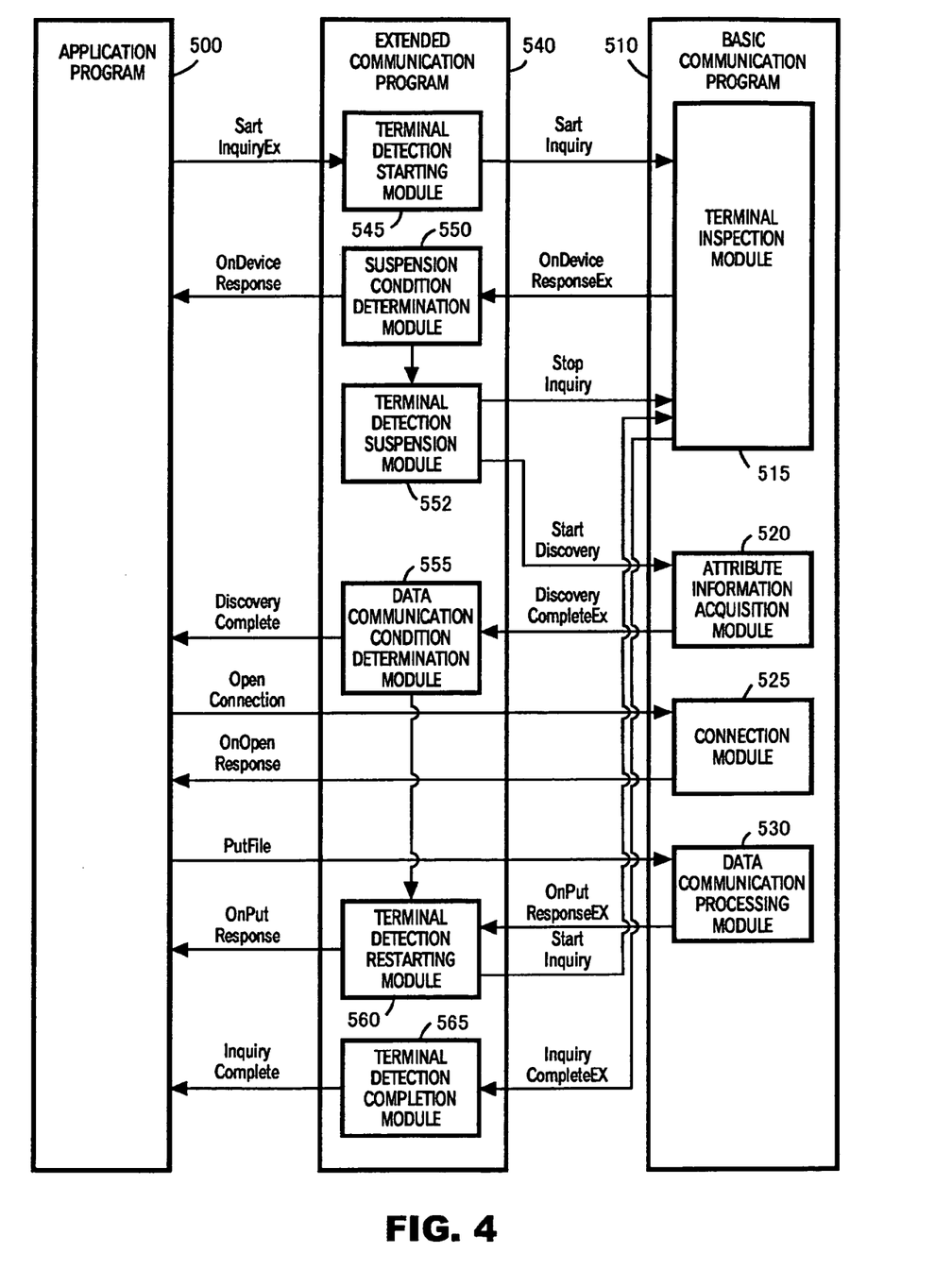
FIG. 4 shows construction of a program running on the information processing device 900 in the embodiment of the present invention.

FIG. 4 shows construction of programs running on the information processing device 900 in this embodiment. The information processing device 900 in this embodiment executes programs including an application program 500, a basic communication program 510 and an extended communication program 540. The application program 500 is executed on the information processing device 900 to enable the information processing device 900 to function as the information processing section 200, the external display 1081 and the wired communication section 220. The basic communication program 510 is provided as the basic API of Bluetooth® by the operating system of the information processing device 900 and enables the information processing device 900 to function as a portion of the data communication section. The basic communication program 510 has a terminal detection module 515 for enabling the information processing device 900 to function as the terminal detection section, an attribute information acquisition module 520 for enabling the information processing device 900 to function as the attribute information acquisition section, and a connection module 525 and a data communication processing module 530 for enabling the information processing device 900 to function as the data communication processing section.

The extended communication program 540 is an example of the wireless communication program in accordance with the present invention, which is an extended API for providing a function to suspend the detection processing while providing the application program 500 with the same interface as the basic API of Bluetooth® provided by the basic communication program 510. The extended communication program 540 has a terminal detection starting module 545 and a terminal detection completion module 565 for extending the functions of the terminal detection module 515, a suspension condition determination module 550 for enabling the information processing device 900 to function as the suspension condition determination section, a terminal detection suspension module 552 for enabling the information processing device 900 to function as the terminal detection suspension section, a data communication condition determination module 555 for enabling the information processing device 900 to function as the data communication condition determination section, and a terminal detection restarting module 560 for enabling the information processing device 900 to function as the terminal detection restarting section.

The operation of the information processing device 900 realized by executing these programs and modules on the information processing device 900 will next be described.

First, the information processing section 200 implemented by executing the application program 500 on the information processing device 900 invokes a StartInquiryEx function which is an extended API for an instruction to start the detection processing and to make the information processing device 900 execute the terminal detection starting module 545. This StartInquiryEx function is a function extended by overriding a StartInquiry function which is a basic API provided by the terminal detection module 515 to instruct the basic communication program 510 to start the detection processing. Next, the information processing device 900 initializes internal variables of the extended communication program 540 by executing the terminal detection starting module 545, and invokes the StartInquiry function to execute the terminal detection module 515.

Next, the terminal detection section implemented by executing the terminal detection module 515 on the information processing device 900 is called by the terminal detection starting module 545 to perform processing for detecting wireless communication terminals 100. When the terminal detection section detects a wireless communication terminal 100, it invokes an OnDeviceResponseEx function provided by the suspension condition determination module 550. The OnDeviceResponseEx function is a function extended by overriding an OnDeviceResponse function which implements processing to be performed by the application program 500 when a wireless communication terminal 100 is detected, e.g., processing for registering the wireless communication terminal 100 in a communicating terminal list as a terminal with which communication will be performed.

The terminal detection section thereby notifies the suspension condition determination module 550 for enabling the information processing device 900 to function as the suspension condition determination section that the wireless communication terminal 100 has been detected. If the detection processing is suspended regardless of the result of determination of the suspension condition, the terminal detection section may invoke the OnDeviceResponseEx function to notify the terminal detection suspension module 552 for enabling the information processing device 900 to function as the terminal detection suspension section.

Next, the suspension condition determination section implemented by executing the suspension condition determination module 550 on the information processing device 900 is called by the terminal detection module 515 to determine whether the suspension condition is satisfied or not satisfied, and output the determination result to the terminal detection suspension module 552. If the suspension condition is not satisfied, the suspension condition determination section invokes the OnDeviceResponseEx function to notify the information processing section 200 that the wireless communication terminal 100 has been detected.

Next, when the terminal detection suspension section implemented by executing the terminal detection suspension module 552 on the information processing device 900 is notified of the detection of the wireless communication terminal 100, it invokes a StopInquiry function provided by the terminal detection module 515 to suspend the detection of a plurality of wireless terminals 100 performed by the terminal detection section. The terminal detection suspension section also invokes a StartDiscovery function provided by the attribute information acquisition module 520 to instruct the data communication section to start date communication. When the terminal detection suspension section suspends the detection processing according to the suspension condition, it performs these processings on condition that the suspension condition is satisfied.

Next, the attribute information acquisition section implemented by executing the attribute information acquisition module 520 on the information processing device 900 acquires attribute information from the detected wireless communication terminal 100 and then invokes a DiscoveryCompleteEx function provided by the data communication condition determination module 555. The DiscoveryCompleteEx function is a function extended by overriding a DiscoveryComplete function which implements processing to be performed by the application program 500 after acquisition of the attribute information from the wireless communication terminal 100.

Next, the data communication condition determination section implemented by executing the data communication condition determination module 555 on the information processing device 900 determines whether or not data communication with the detected wireless communication terminal 100 will be performed while the detection processing is suspended. If the data communication condition determination section determines that the data communication will not be performed, it causes the process to branch to the terminal detection restarting module 560. If the data communication condition determination section determines that the data communication will be performed, it invokes the DiscoveryComplete function. In response thereto, the information processing device 900 executes the application program 500 and invokes an OpenConnection function provided by the connection module 525. The information processing device 900 then executes the connection module 525 to establish a connection to the wireless communication terminal 100, and invokes an OnOpenResponse function. Next, the information processing device 900 executes the application program 500 invoked by the OnOpenResponse function and invokes a PutFile function provided by the data communication processing module 530 to provide an instruction to transmit the information file to be transferred to the wireless communication terminal 100.

Next, the data communication processing section implemented by executing the data communication processing module 530 on the information processing device 900 performs data communication when it is instructed to start the data communication from the terminal detection suspension section via invocation of the attribute information acquisition module 520, the data communication condition determination module 555, the application program 500, the connection module 525 and the data communication processing module 530. The data communication processing section invokes an OnPutResponseEx function to notify the terminal detection restarting section of completion of the data communication. The OnPutResponseEx function is a function extended by overriding an OnPutResponse function for implementing processing to be performed by the application program 500 when the completion of data communication is received.

Next, when the terminal detection restarting section implemented by executing the terminal detection restarting module 560 on the information processing device 900 is notified of the completion of data communication by the invocation of the OnPutResponseEx function, it invokes the StartInquiry function to instruct the terminal detection section to perform the detection of a plurality of wireless communication terminals 100 again, and invokes the On PutResponse function to notify the completion of data communication with the wireless communication terminal 100. The terminal detection restarting section also provides an instruction to start the detection of wireless communication terminals 100 again in a case where the data communication condition determination module 555 determines that data communication will not be performed while the detection processing is suspended.

When the terminal detection section is instructed to perform detection of wireless communication terminals 100 again, it transmits inquiry packets and detects one by one a plurality of wireless terminals 100 transmitting inquiry response packets. If it detects no wireless communication terminal 100 within the detection completion timeout period after restarting the transmission of inquiry packets, it completes the detection of wireless communication terminals 100 and invokes an InquiryCompleteEx function provided by the terminal detection completion module 565. The InquiryCompleteEx function is a function extended by overriding an InquiryComplete function for implementing processing to be performed by the application program 500 when the detection processing is completed after a timeout.

The information processing device 900 executes the terminal detection completion module 565 to notifies the application program 500 of identification information for a plurality of wireless communication terminals 100 detected in the detection processing. The information processing device 900 may treat wireless communication terminals 100 with which data communication has already been performed as if they have not been detected in the detection processing, and may remove them from the identification information list to be notified to the application program 500.

In the above-described extended communication program 540, the StartDiscovery function is invoked after invocation of the OnDeviceResponseEx function, the DiscoveryComplete function is invoked after invocation of the DiscoveryCompleteEx function to invoke the PutFile function, and the StartInquiry function is invoked after invocation of the OnPutResponseEx function. Thus, the extended communication program 540 enables extension of the basic communication program 510 without making no substantial change in the interlace with the application program 500, and invokes the functions of the basic communication program 510 and the application program 500 in a chaining manner when a wireless communication terminal 100 is detected by the terminal detection module 515, thereby implementing the functions of the information processing device 900.

Figure 5:
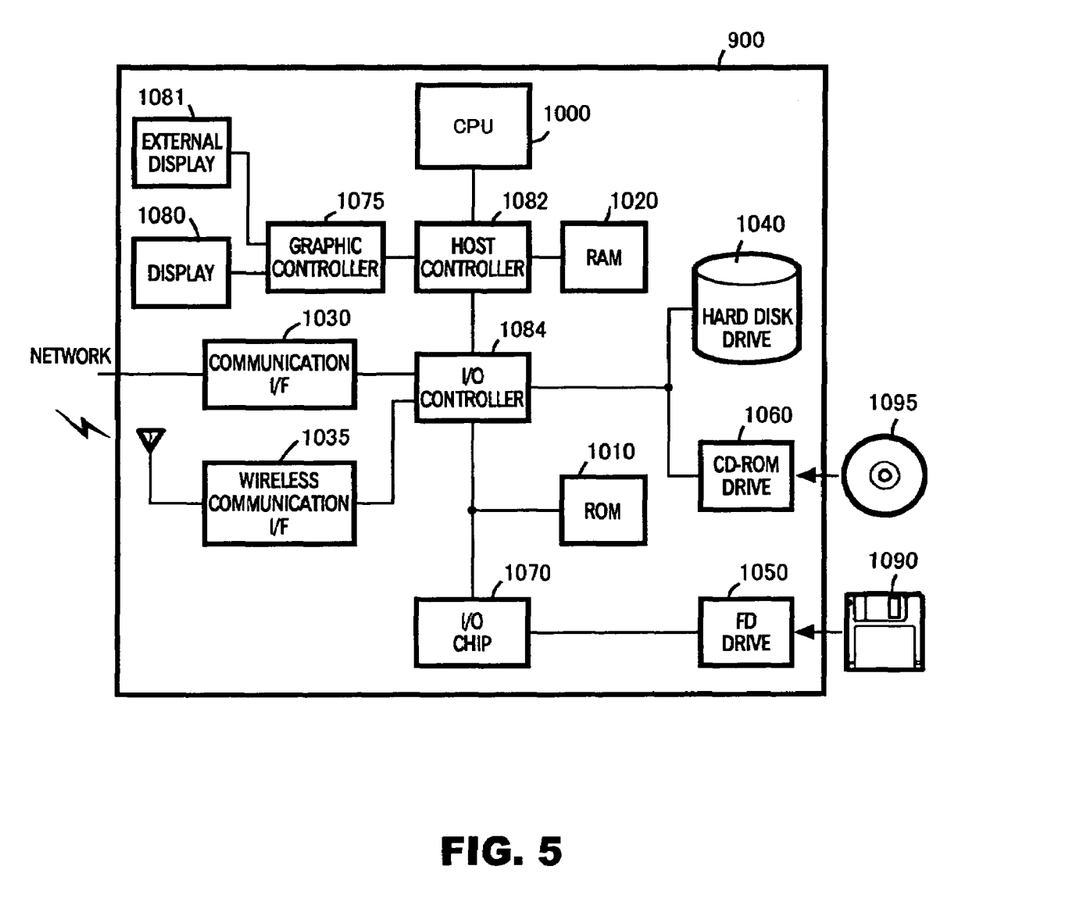
FIG. 5 shows a hardware configuration of the information processing device 900 in the embodiment of the present invention.

FIG. 5 shows a hardware configuration of the information processing device 900 in this embodiment. The information processing device 900 in this embodiment has a CPU related section having a CPU 1000, a RAM 1020, a graphic controller 1075, a display 1080 and an external display 1081 which are interconnected by a host controller 1082, an input/output section having a communication interface 1030, a wireless communication interface 1035, a hard disk drive 1040 and a CD-ROM drive 1060 connected to the host controller 1082 by an input/output controller 1084, and a legacy input/output section having a ROM 1010, a flexible disk drive 1050 and an input/output chip 1070 connected to the input/output controller 1084.

The host controller 1082 connects the RAM 1020 with the CPU 1000 and the graphic controller 1075 which access the RAM 1020 at a high transfer rate. The CPU 1000 operates according to the programs stored in the ROM 1010 and the RAM 1020, and controls each component. The graphic controller 1075 obtains image data generated by the CPU 1000 or other components on a frame buffer provided in the RAM 1020, and displays the image data on the display 1080 and/or external display 1081. Alternatively, the graphic controller 1075 may contain therein a frame buffer for storing image data generated by the CPU 1000 or other components.

The input/output controller 1084 connects the host controller 1082 with the communication interface 1030, the hard disk drive 1040 and the CD-ROM drive 1060 each which is a relatively fast input/output device. The communication interface 1030 communicates with other systems through the network 110. The wireless communication interface 1035 communicates with each of a plurality of wireless communication terminals 100 by short-range wireless communication such as Bluetooth®. The hard disk drive 1040 stores programs and data used by the CPU 1000 in the information processing device 900. The CD-ROM drive 1060 reads a program or data from a CD-ROM 1095 and provides the read program or data to the hard disk drive 1040 via the RAM 1020. Also connected to the input/output controller 1084 are the ROM 1010 and relatively slow input/output devices such as the flexible disk drive 1050 and the input/output chip 1070. The ROM 1010 stores a boot program executed at the time of startup of the information processing device 900, and programs dependent on the hardware of the information processing device 900. The flexible disk drive 1050 reads a program or data from a flexible disk 1090 and provides the read program or data to the hard disk drive 1040 via the RAM 1020. The input/output chip 1070 connects the flexible disk drive 1050 and various input/output devices via, for example, a parallel port, a serial port, a keyboard port and a mouse port.

A program provided to the hard disk drive 1040 via the RAM 1020 is stored on a recording medium such as the flexible disk 1090, the CD-ROM 1095, or an IC card, and provided by a user. The program is read out from the recording medium, installed in the hard disk drive 1040 in the information processing device 900 via the RAM 1020, and executed in the CPU 1000.

The basic communication program 510 included in the wireless communication program installed in the information processing device 900 has the terminal detection module 515, the attribute information acquisition module 520, the connection module 525 and the data communication processing module 530. These programs or modules enable the information processing device 900 to function as a portion of the terminal detection section the attribute information acquisition section and the data communication processing section.

The extended communication program included in the wireless communication program installed in the information processing device 900 has the terminal detection starting module 545, the terminal detection completion module 565, the suspension condition determination module 550, the terminal detection suspension module 552, the data communication condition determination module 555 and the terminal detection restarting module 560. These programs or modules enable the information processing device 900 to function as a portion of the terminal detection section, the suspension condition determination section, the terminal detection suspension section, the data communication condition determination section and the terminal detection restarting section.

The above-described programs or modules may be stored on an external storage medium. As the recording medium, an optical recording medium such as a DVD or a PD, a magneto-optic recording medium such as an MD, a tape medium, a semiconductor memory such as an IC card, or the like can be used in addition to the flexible disk 1090 and the CD-ROM 1095. Also, a storage device such as a hard disk or a RAM provided in a server system connected to a private communication network or the Internet may be used as the recording medium to provide the programs to the information processing device 900 via the network.

Figure 6:
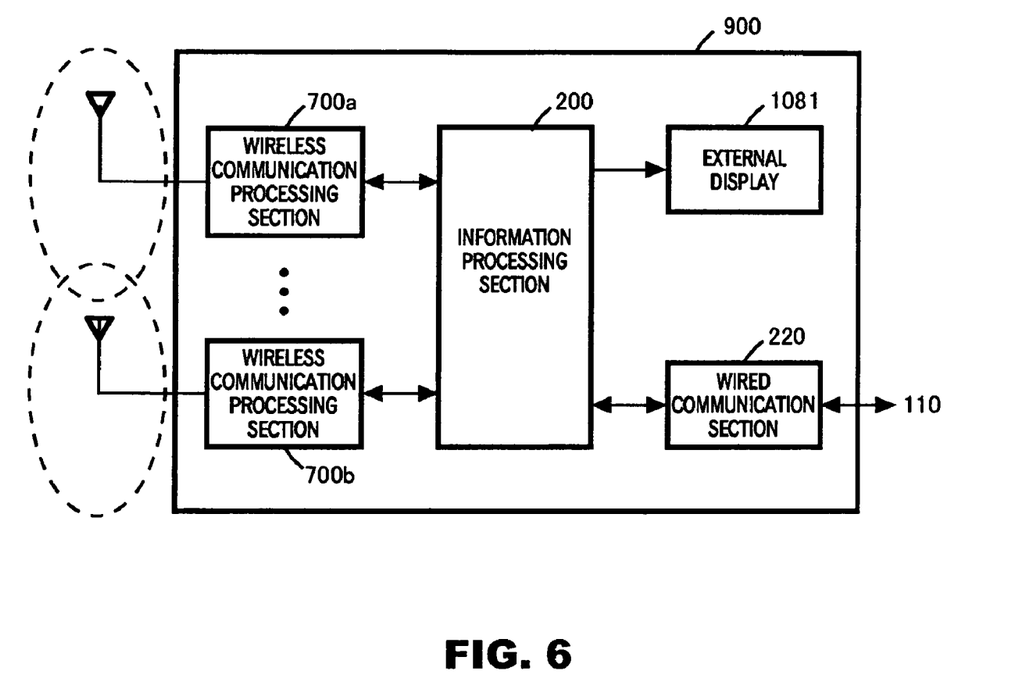
FIG. 6 shows a functional configuration of the information processing device 900 in a modified embodiment of the present invention.

FIG. 6 shows a functional configuration of an information processing device 900 in a modified embodiment. The information processing device 900 in this modified embodiment has a plurality of wireless communication processing sections 700 each including a set of previously described sections including the wireless communication section, the terminal detection section, the suspension condition determination section, the terminal detection suspension section, the data communication section and the terminal detection restarting section. Since these sections have already been described, detailed descriptions thereof will be omitted except for the following difference.

The wireless communication processing sections 700 (700a, 700b) perform wireless communication at different positions. The wireless communication processing sections 700 are placed so that their communication areas partly overlap each other. For example, the wireless communication section 700a and the wireless communication section 700b are placed so that an area within which the wireless communication section 700a can communicate and an area within which the wireless communication section 700b can communicate partly overlap each other.

In this modified embodiment, at least one of the terminal detection suspension sections provided in the wireless communication processing sections 700 determines whether or not data communication will be performed by suspending the detection processing according to whether or not a wireless communication terminal detected by a terminal detection section associated with that terminal detection suspension section has also been detected by other wireless communication processing sections 700 whose number is equal to or larger than a predetermined number. More specifically, in a case where the wireless communication terminal 100 detected by the terminal detection section associated with that terminal detection suspension section within the detection completion timeout period after the transmission of inquiry packets was started has not been detected by other terminal detection sections whose number is equal to or larger than the predetermined number, that terminal detection suspension section suspends the detection of wireless communication terminals 100 performed by the terminal detection section associated with that terminal detection suspension section to permit the data communication section to perform data communication. The data communication section notifies the other wireless communication processing sections 700 that data communication with the wireless communication terminal 100 has been completed, thereby preventing the other wireless communication processing sections 700 from trying data communication again.

If the wireless communication terminal 100 has been detected by terminal detection sections whose number is equal to or larger than the predetermined number, that terminal detection suspension section allows the terminal detection section associated with that terminal detection suspension section to continue detection of wireless communication terminals 100.

The information processing device 900 in this modified embodiment is capable of immediately performing data communication by suspending the detection processing with respect to a wireless communication terminal 100 existing at a place where it can communicate only with wireless communication processing sections 700 whose number is equal to or smaller than the predetermined number. Thus, the information processing device 900 can perform data communication before it becomes impossible for that wireless communication terminal 100 to communicate using any of the wireless communication processing sections 700.

Embodiments of the present invention include various functions, which have been described above. The functions may be performed by hardware components or may be embodied in machine-executable instructions, which may be used to cause a general-purpose or special-purpose processor programmed with the instructions to perform the functions. Alternatively, the functions may be performed by a combination of hardware and software.

An Embodiment of the present invention may be provided as a computer program product which may include a machine-readable storage medium having stored thereon instructions which may be used to program a computer (or other electronic devices) to perform a process according to any of the embodiments of the present invention. The machine-readable storage medium may include, but is not limited to, floppy diskettes, optical disks, CD-ROMs, and magneto-optical disks, ROMs, RAMs, EPROMs, EEPROMs, magnet or optical cards, or other type of machine-readable storage medium suitable for storing electronic instructions. Moreover, an embodiment of the present invention may also be downloaded as a computer program product, wherein the program may be transferred from a remote computer to a requesting computer.

Similarly, an embodiment of the present invention may be provided as a method in which a service provider deploys computing infrastructure and program product in combination such that, once deployed, the combination performs a process according to any of the embodiments of the present invention.

In the drawings and specifications there has been set forth a preferred embodiment of the invention and, although specific terms are used, the description thus given uses terminology in a generic and descriptive sense only and not for purposes of limitation. While the present invention has been described with respect to an embodiment thereof, the technical scope of the present invention is not limited to the described embodiment. It is apparent to those skilled in the art that various changes or modifications can be made in the described embodiment. It is apparent from the appended claims that such changed or modified forms are included in the technical scope of the present invention.

Similarly, terms used generically in the following claims are not limited to the specific embodiments disclosed. For clarity, and not for purposes of limitation, the table which follows provides at least one disclosure terminology example for each generic claim term.

| Non-limiting Disclosure Example | Generic Claim Term |
| --- | --- |
| terminal detection section | terminal detector |
| terminal detection suspension section | terminal suspender |
| data communication section | wireless tranceiver |
| terminal detection restarting section | initialization circuit |
| suspension condition determination section | group circuit |
| attribute information acquisition section | attribute circuit |
| data communication condition determination section | suspended communication determiner |
| data communication processing section | data processor |

What is claimed is:

1. Apparatus comprising:
a personal area network device connecting at short range with any wireless communication terminal within range, comprising:
a terminal detector which transmits an inquiry packet for inquiry as to whether any wireless communication terminal exists within range as to be able to communicate with the apparatus, detects one by one a plurality of wireless data communication terminals transmitting inquiry response packets in response to the inquiry packet, and completes the detection of wireless communication terminals if no wireless communication terminal is detected within a predetermined detection completion timeout period after starting the transmission of the inquiry packet;
a terminal suspender, coupled to said terminal detector, which suspends the detection of wireless communication terminals performed by said terminal detector if one of the wireless communication terminals is detected within the detection completion timeout period;
a wireless transceiver, coupled to said terminal detector, which connects to and then performs wireless data communication with the wireless communication terminal detected by said terminal detector while the detection of wireless communication terminals is suspended; and an initialization circuit, coupled to said terminal detector, which restarts detection of other wireless communication terminals by said terminal detector after completion of both the connection and the data communication is detected;

wherein if one of the wireless communication terminals is detected within a predetermined detection suspension timeout period shorter than the detection completion timeout period after the transmission of the inquiry packet was started, said terminal suspender suspends the detection of wireless communication terminals performed by said terminal detector; and wherein while the detection of wireless communication terminals is suspended, said wireless transceiver performs data communication with the wireless communication terminal detected by said terminal detector within the detection suspension timeout period.

2. The apparatus according to claim 1, wherein said terminal detector transmits a plurality of inquiry packets one by one and detects one by one the respective wireless communication terminals transmitting the inquiry response packets in response to any one of said inquiry packets, and said terminal suspender suspends the transmission of the inquiry packets by said terminal detector before the detection completion timeout period has lapsed in a case where one of the wireless communication terminals is detected by said terminal detector within the detection completion timeout period after said terminal detector started the transmission of the inquiry packets.

3. The apparatus according to claim 1, wherein after the detection of other wireless communication terminals is restarted by said initialization circuit, said terminal detector transmits the inquiry packet and detects one by one a plurality of wireless communication terminals transmitting the inquiry response packets, and completes the detection of wireless communication terminals if no wireless communication terminal is detected within the detection completion timeout period after starting the transmission of the inquiry packet.

4. The apparatus according to claim 3, wherein after said terminal detector detects one of the wireless communication terminals, it notifies said terminal suspender that a wireless communication terminal is detected; wherein after said terminal suspender receives a notice indicating that the wireless communication terminal is detected, it suspends the detection of wireless communication terminals performed by said terminal detector, and instructs said wireless transceiver to start the data communication; wherein after said wireless transceiver is instructed by said terminal suspender to start the data communication, it performs the data communication and notifies said initialization circuit of the completion of the data communication; wherein after said initialization circuit is notified of the completion of the data communication, it instructs said terminal detector to perform the detection of wireless communication terminals again; and wherein after said terminal detector is instructed to perform the detection of wireless communication terminals again, it transmits the inquiry packet, detects one by one a plurality of wireless communication terminals transmitting the inquiry response packets, and completes the detection of wireless communication terminals if no wireless communication terminal is detected within the detection completion timeout period after the transmission of the inquiry packet was started again.

5. The apparatus according to claim 1, further comprising a group circuit which determines that a suspension condition for suspending the detection of wireless communication terminals is satisfied in response to a determination, in a case where one of the wireless communication terminals is detected within the detection completion timeout period after the transmission of the inquiry packet was started, that the detected wireless communication terminal belongs to a predetermined group of wireless communication terminals based on identification information for the wireless communication terminal contained in the inquiry response packet transmitted by the wireless communication terminal, and which suspends the detection of wireless terminals after it determines that the wireless communication terminal does not belong to the group, wherein in a case where one of the wireless communication terminals is detected within the detection completion timeout period after the transmission of the inquiry packet was started, said terminal suspender suspends the detection of wireless communication terminals performed by said terminal detector if it is determined that the suspension condition is satisfied, and does not suspend the detection of wireless communication terminals performed by said terminal detector if it is determined that the suspension condition is not satisfied.

6. The apparatus according to claim 1, wherein said wireless transceiver includes: an attribute circuit which transmits to the wireless communication terminal detected by said terminal detector an attribute information request packet for requesting transmission of attribute information set in the wireless communication terminal while the detection of wireless communication terminals is suspended, and which acquires the attribute information contained in an attribute information response packet transmitted from the wireless communication terminal receiving the attribute information request packet; a suspended communication determiner which determines, based on the attribute information, whether wireless data communication with the wireless communication terminal detected by said terminal detector will be performed while the detection of wireless communication terminals is suspended; and a data processor which performs the data communication while the detection of wireless communication terminals is suspended if it is determined that the data communication will be performed while the detection of wireless communication terminals is suspended, and which performs the data communication after the completion of the detection of wireless communication terminals if it is determined that the data communication will not be performed while the detection of wireless communication terminals is suspended; wherein said initialization circuit restarts detection of other wireless communication terminals by said terminal detector after a predetermined condition, the predetermined condition being selected from the group consisting of the detection of the completion of the data communication and the determination that the data communication will not be performed while the detection of wireless communication terminals is suspended.

7. The apparatus according to claim 1, wherein a plurality of sets each including said terminal detector, said terminal suspender, said wireless transceiver and said initialization circuit are provided; and wherein at least one of said terminal suspenders suspends the detection of wireless communication terminals performed by said terminal detector associated with that terminal suspender if a wireless communication terminal detected by said terminal detector associated with that terminal suspender within the detection completion timeout period after the transmission of the inquiry packet was started has not been detected by other terminal detectors whose number is equal to or larger than a predetermined number.

8. The apparatus according to claim 1, wherein after the detection of other wireless communication terminals is restarted by said initialization circuit, said terminal detector transmits the inquiry packet and detects one by one wireless communication terminals with which the data communication has not been performed by said wireless transceiver among a plurality of wireless communication terminals transmitting the inquiry response packets.

9. A method comprising:

connecting a personal area network device at short range with any wireless communication terminal within range, comprised of:

transmitting by a terminal detector an inquiry packet to detect wireless communication terminals within range as to be able to communicate with an information processing device, detecting one by one a plurality of wireless communication terminals transmitting inquiry response packets in response to the inquiry packet, and completing the detection of wireless communication terminals if no wireless communication terminal is detected within a predetermined detection completion timeout period after the transmission of the inquiry packet was started;

suspending the detection of wireless communication terminals if one of the wireless communication terminals is detected within the detection completion timeout period after the transmission of the inquiry packet was started;

connecting to and performing wireless data communication with the two or more detected wireless communication terminals while the detection of wireless communication terminals is in a suspended state, wherein the connection to and the data communication with the two or more detected wireless communication terminals occurs during respective corresponding suspension states;

restarting detection of other wireless communication terminals in said terminal detection step after the completion of the data communication is detected: and if one of the wireless communication terminals is detected within a predetermined detection suspension timeout period shorter than the detection completion timeout period alter the transmission of the inquiry packet was started, suspending the detection of the wireless communication terminals, and while the detection of the wireless communication terminals is suspended performing data communication with the one of the wireless communication terminals detected within the detection suspension timeout period.

10. A computer program product comprising:

a computer readable storage medium having computer readable program code stored therein for controlling communication between a wireless communication terminal and an information processing device of a personal area network, the computer readable program code in said computer readable storage medium being effective to, when executed on the information processing device, cause the information processing device to connect the personal area network at short range with any wireless communication terminal within range by executing a series of computer executable steps effective to:

transmit an inquiry packet for inquiry as to whether any wireless communication terminal exists within range as to be able to communicate with said information processing device, detect one by one a plurality of wireless data communication terminals transmitting inquiry response packets in response to the inquiry packet, and complete the detection of wireless communication terminals if no wireless communication terminal is detected within a predetermined detection completion timeout period after the transmission of the inquiry packet was started, suspend the detection of wireless communication terminals if a wireless communication terminal is detected within the detection completion timeout period after the transmission of the inquiry packets;

perform wireless data communication with the wireless communication terminal while the detection of wireless communication terminals is suspended, wherein the wireless data communication does not include communication of information related to establishing a connection with the wireless communication terminal;

restart detection of other wireless communication terminals after the completion of the data communication is detected; and if one of the wireless communication terminals is detected within a predetermined detection suspension timeout period shorter than the detection completion timeout period after the transmission of the inquiry packet was started, suspend the detection of wireless communication terminals, and while the detection of wireless communication terminals is suspended perform data communication with the wireless communication terminal detected within the detection suspension timeout period.

11. A method comprising:

deploying computing infrastructure by integrating computer readable code into an information processing device of a personal area network connecting at short range to any wireless communication terminal within range, the information processing device configured by the computer readable code to control communication between a wireless communication terminal and the information processing device, the information processing device being provided with a terminal detection section which is configured by the computer readable code to transmit an inquiry packet for inquiry as to whether any wireless communication terminal exists within range as to be able to communicate with the information processing device, detect one by one a plurality of wireless data communication terminals transmitting inquiry response packets in response to the inquiry packet, and complete the detection of wireless communication terminals if no wireless communication terminal is detected within a predetermined detection completion timeout period after the transmission of the inquiry packet was started, wherein the information processing device is configured by the computer readable code stored on the information processing device to perform the following:

suspending the detection of wireless communication terminals performed by the terminal detection section if a wireless communication terminal is detected within the detection completion timeout period after the terminal detection section started the transmission of the inquiry packets;

connecting to the wireless communication terminal detected by the terminal detection section while the detection of wireless communication terminals is suspended;

performing wireless data communication with the wireless communication terminal detected by the terminal detection section while the detection of wireless communication terminals is suspended;

restarting detection of other wireless communication terminals by the terminal detection section after the completion of the data communication is detected; and if one of the wireless communication terminals is detected within a predetermined detection suspension timeout period shorter than the detection completion timeout period after the transmission of the inquiry packet was started, suspending the detection of the wireless communication terminals, and while the detection of the wireless communication terminals is suspended performing data communication with the one of the wireless communication terminals detected within the detection suspension timeout period.

12. The apparatus of claim 1, wherein the wireless data communication does not include communication of information relating to making a connection between the wireless transceiver and the detected wireless communication terminal.

13. The apparatus of claim 1, wherein the wireless data communication includes communication of an advertisement from the wireless transceiver to the detected wireless communication terminal.

14. The apparatus of claim 1, wherein the wireless data communication includes communication of an identification of a store in which the wireless transceiver is in to the detected wireless communication terminal.

15. The apparatus of claim 1, wherein the wireless data communication includes communication of information between two wireless communication terminals and the wireless transceiver.

16. The apparatus of claim 1, wherein the wireless data communication includes communication of information from the wireless communication terminal to the wireless transceiver, which displays the information via an external display connected thereto.

17. The apparatus of claim 16, wherein the information includes a web page.

18. The apparatus of claim 1, wherein the wireless communication terminal is a personal data assistant.

19. The apparatus of claim 1, wherein the wireless data communication includes a service to connect the wireless communication terminal to a network.

* * * * *

UNITED STATES PATENT AND TRADEMARK OFFICE
CERTIFICATE OF CORRECTION

PATENT NO. : 7,593,350 B2  Page 1 of 1
APPLICATION NO. : 10/989812
DATED : September 22, 2009
INVENTOR(S) : Satoshi Itoh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1002 days.

Signed and Sealed this

Twenty-first Day of September, 2010

David J. Kappos
*Director of the United States Patent and Trademark Office*